(12) United States Patent
Parkinson

(10) Patent No.: US 8,414,235 B2
(45) Date of Patent: Apr. 9, 2013

(54) SINGLE POINT RELEASE SYSTEM

(75) Inventor: Stephen T. Parkinson, Suffield, CT (US)

(73) Assignee: Capewell Components Company, LLC, South Windsor, CT (US)

(*) Notice: Subject to any disclaimer, the term of this patent is extended or adjusted under 35 U.S.C. 154(b) by 121 days.

(21) Appl. No.: 13/170,342

(22) Filed: Jun. 28, 2011

(65) Prior Publication Data

US 2012/0009040 A1   Jan. 12, 2012

Related U.S. Application Data

(60) Provisional application No. 61/359,040, filed on Jun. 28, 2010, provisional application No. 61/359,034, filed on Jun. 28, 2010.

(51) Int. Cl.
*B60P 7/08* (2006.01)

(52) U.S. Cl.
USPC .......... 410/23; 410/4; 410/7; 410/46; 410/97

(58) Field of Classification Search ........... 410/4, 7, 410/9, 10, 11, 23, 46, 96, 97; 244/118.1, 244/137.3; 248/499
See application file for complete search history.

(56) References Cited

U.S. PATENT DOCUMENTS

| | | | |
|---|---|---|---|
| 2,557,105 A * | 6/1951 | Hight | |
| 2,784,938 A * | 3/1957 | Huber | |
| 6,558,093 B1 * | 5/2003 | Arnold et al. | 410/30 |
| 7,118,314 B2 * | 10/2006 | Zhou et al. | 410/84 |
| 7,931,428 B2 * | 4/2011 | Stille | 410/7 |

* cited by examiner

*Primary Examiner* — Stephen Gordon
(74) *Attorney, Agent, or Firm* — Alix, Yale & Ristas, LLP

(57) ABSTRACT

A single point release system provides a single point for efficiently, concurrently releasing multiple cargo retaining latches of an aerial delivery system. A release module is mounted to the platform and connects via a cable and is actuable to a release mode to concurrently release each of the latches.

5 Claims, 7 Drawing Sheets

SINGLE POINT RELEASE SYSTEM

CROSS-REFERENCE TO RELATED APPLICATION

This application claims the priority of U.S. Provisional Patent Application No. 61/359,040 filed on Jun. 28, 2010 and U.S. Provisional Patent Application No. 61/359,034 filed Jun. 28, 2010, the disclosures of which are incorporated by reference in their entirety.

BACKGROUND

This disclosure relates generally to aerial delivery systems. More specifically, this disclosure relates to systems employed for securing cargo to a platform and for releasing the cargo from the platform.

For aerial delivery systems to which the disclosure relates, a cargo is secured to a platform which is loaded into the aircraft. The platform is extracted from the aircraft by an extraction parachute. Suspension parachutes are subsequently opened to complete the aerial delivery. The cargo is secured to the platform by various techniques which may, for example, include flexible straps secured around the cargo and placed in tension. For aerial delivery which involves land delivery, upon landing of the cargo, the straps are released to obtain access or usage of the cargo. For aerial delivery of vehicles, typically, four pairs of straps are employed. The straps are latched about the axles or other connection points at the underside of the vehicle and placed in tension. Upon landing of the platform, typically, each of the four latch assemblies is independently released so that the cargo vehicle may be unloaded from the platform.

For some aerial delivery applications, the cargo is essentially released in mid-air. For example, a rigid hull inflatable boat may be secured to a platform. A series of spigots on the rigid hull inflatable boat gunwale are engaged with calipers. The calipers are maintained in a closed motion by tension and restraining straps which locate the calipers for the aerial delivery platform. It is essential for safe water entry that the rigid inflatable boat be released prior to landing of the support platform. A release assembly employs a drop arm. The drop arm is operable to displace rods of a mechanical rod system. Each rod is connected for disengaging one end of the strap modules. When the platform is extracted from the aircraft, the drop arm drops and transfers the force via the mechanical rods to disengage the connection on the end of each strap module.

SUMMARY

Briefly stated, a single point release system comprises a platform and a plurality of securement modules mounted to the platform. Each module comprises a first adjustable strap anchored to the platform and having a first latching end and a second adjustable strap anchored to the platform and having a second latching end. A latch mechanism comprises a releasable latch. The releasable latch selectively latches the first and second latching ends. The latch mechanism comprises a lock member actuatable by a mechanical cable which engages the latch, to lock the latch and to release the latch. A release module mounted to the platform connects each of the cables. The release module is configurable in a locked mode wherein each latch is locked and is actuatable in a release mode to concurrently release each of the latches.

An extraction force transfer coupling device is mounted to the platform. The transfer coupling device has a cable connecting the release module wherein the extraction force is transferred to actuate the release mode.

The release mode is preferably actuated by means of a lever. There are four securement modules. The latch mechanism preferably comprises an over-center, generally C-shaped latch which catches over a latch bar.

DETAILED DESCRIPTION

Figure 1:
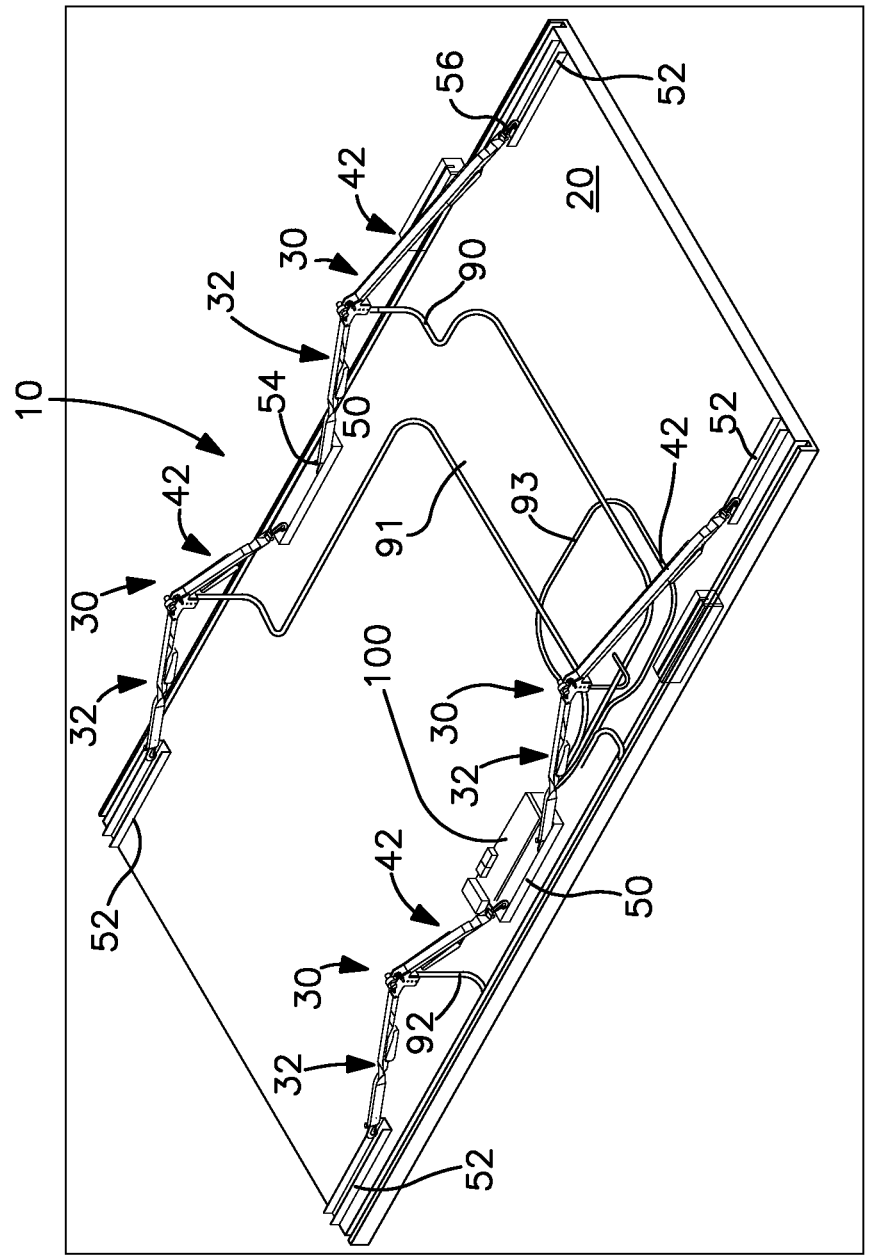
FIG. 1 is a perspective view of an aerial delivery platform incorporating a single point release system.
Figure 2:
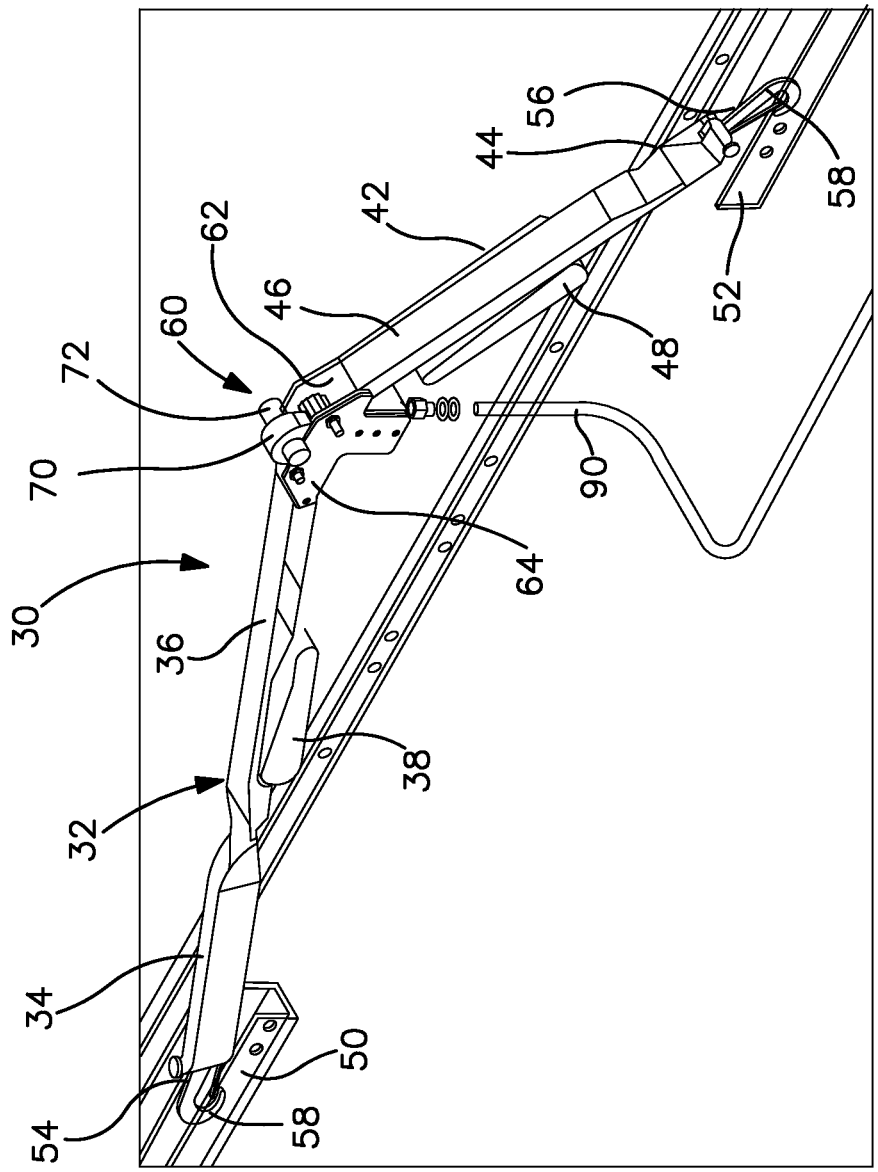
FIG. 2 is an enlarged perspective view of a securement module employed in the aerial delivery platform of FIG. 1.

With reference to the drawings wherein like numerals represent like parts throughout the several Figures, a single point release system for an aerial delivery system is generally designated by the numeral 10. The release system 10 functions to provide a single point for efficiently concurrently releasing the cargo retaining latches for an aerial delivery system. The single point system is adapted to provide a quick release for land based delivery and a more reliable release for mid-air release requirements, such as for a rigid inflatable boat. The single point release system is employed in conjunction with a platform 20 which may be Type V or any other platform employed for aerial delivery.

In one preferred application, four releasably latchable securement modules 30 are mounted to the top of the platform 20. Two pairs of securement modules are provided at opposite sides of the platform. It should be appreciated that numerous other numbers of such modules may be employed.

Each securement module 30 includes a cooperative pair of heavy duty flexible straps 32 and 42 which are each respectively preferably configured with opposite end loops 34, 36 and 44, 46. Each of the straps includes tensioners 38 and 48, respectively. Mounting brackets 50 and 52 are bolted or otherwise attached to the top of the platform and project upwardly for anchoring the ends of the straps to the platform. Preferably, the brackets 50 and 52 are generally elongated U-shaped members. The straps are looped to receive anchor clips 54 and 56 which are retained to the brackets 50 and 52 by pins 58 so that the straps may be variably positionable and configurable to accommodate the various cargo constraints.

The free ends of the straps are latched together to secure cargo to the platform and locked in place by a releasable latch assembly 60 which is remotely releasable from a single control point. Each latch assembly 60 preferably comprises two pairs of transversely cooperative spaced plates 62 and 64 connected in opposed relationship by cross supports. The plates 62 and 64 are configured to minimize interference with the payload.

Each strap 32 and 42 is looped around a pin 66 and 68, respectively, carried by a pair of opposed plates 62 or 64. One plate carries an over-center, pivotal C-shaped latch 70 which pivots and catches over a heavy duty lock bar 72 carried by the other plate for latchably engaging the captured straps. The straps may also be placed in tension for securing the cargo by tensioners 38 and 48.

Figure 3:
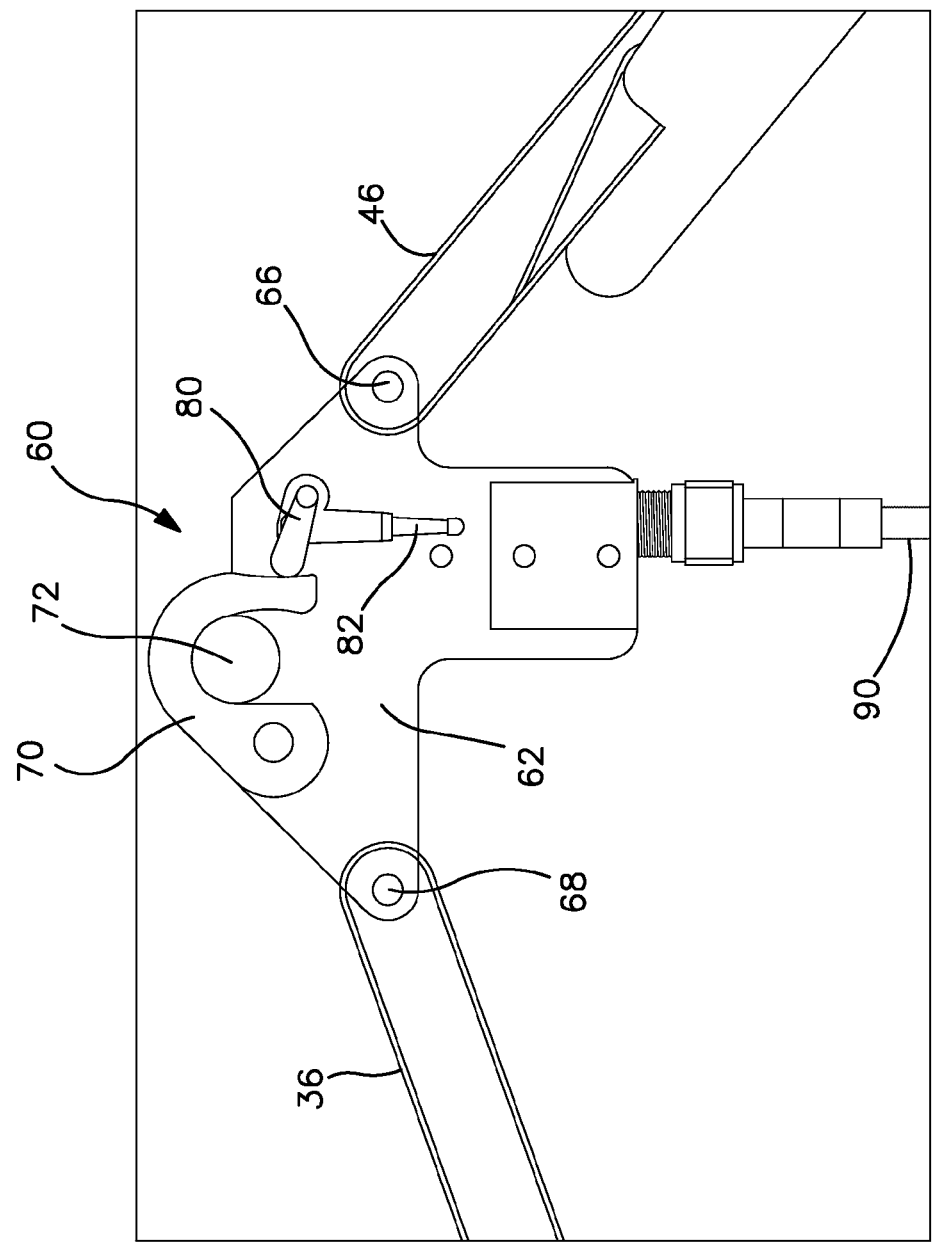
FIG. 3 is an enlarged interior view of a portion of the securement module of FIG. 2 wherein portions have been disassembled and removed for illustrative purposes and further illustrating a portion of the release system.
Figure 4:
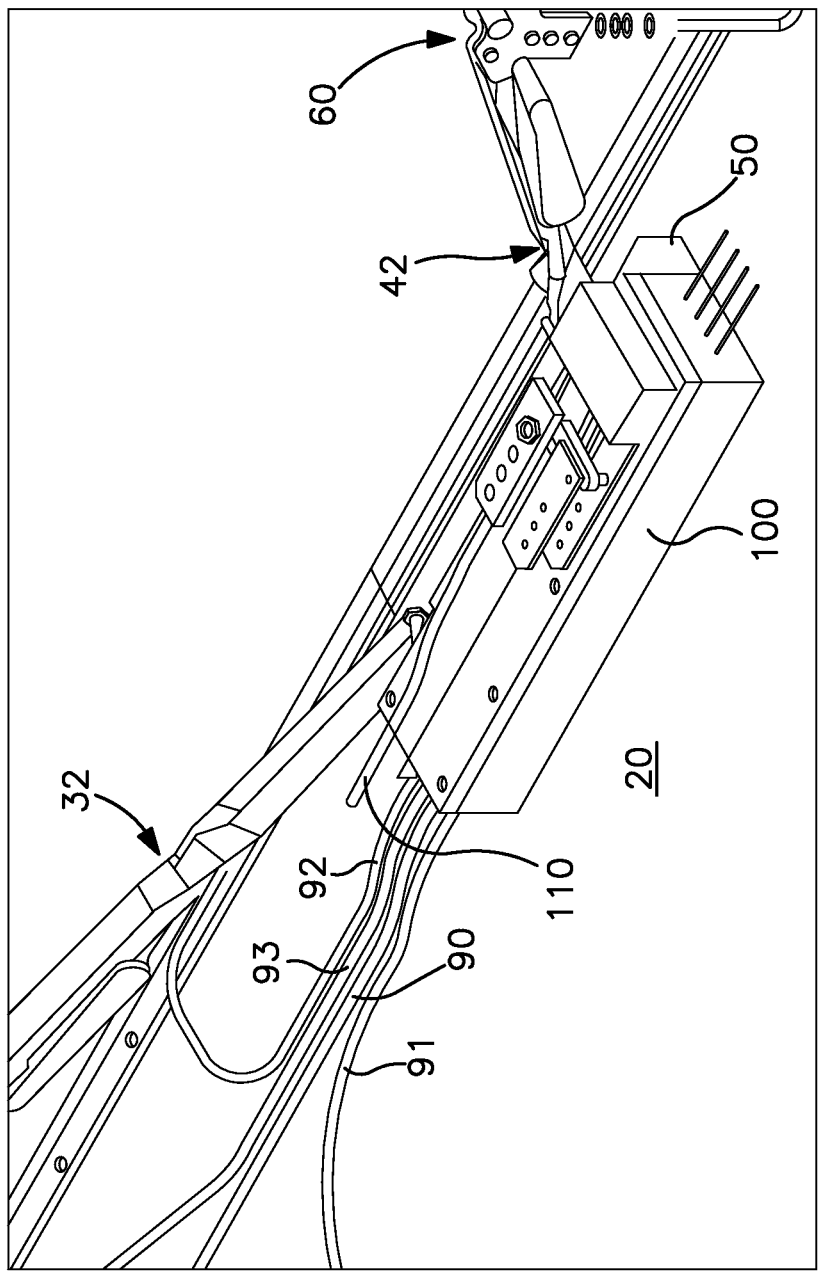
FIG. 4 is an enlarged perspective view of a portion of the single point release system of FIG. 1 which, in particular, illustrates a release module for the release system.
Figure 5:
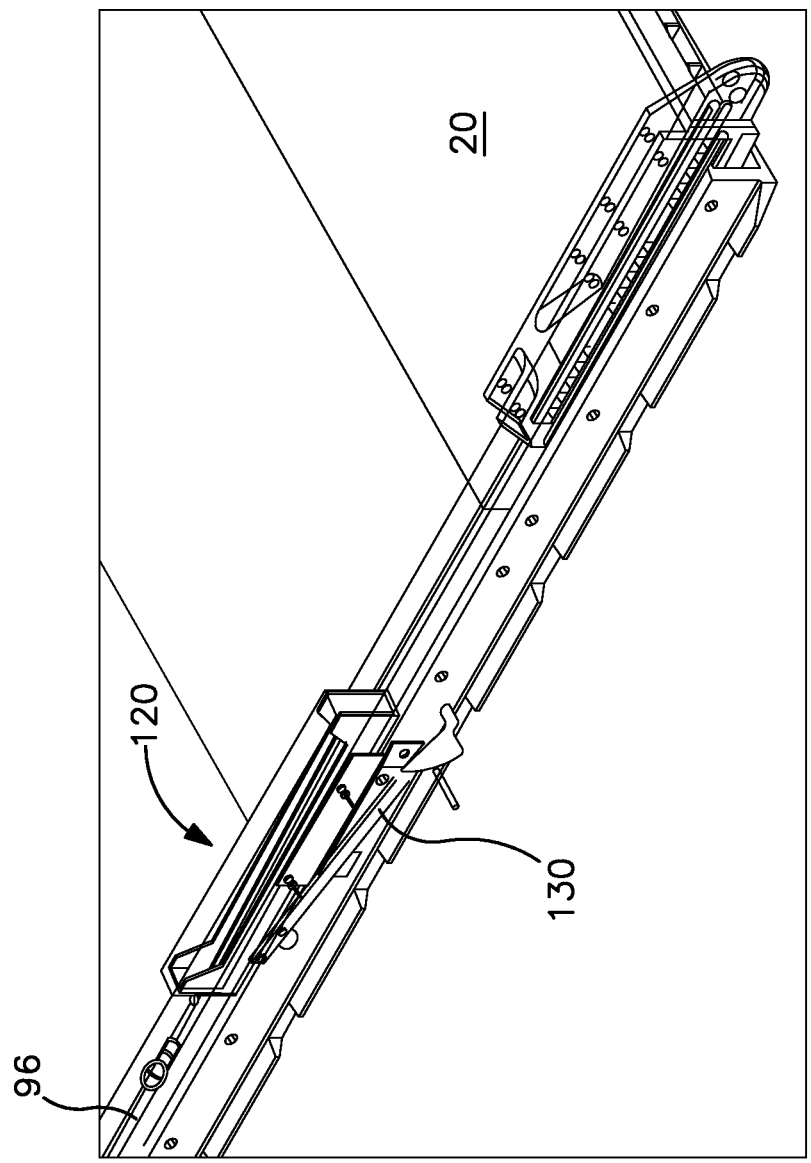
FIG. 5 is a fragmentary view of an alternative embodiment of the single point release system, further illustrating an apparatus which allows for sea-based aerial delivery.

One of the plates carries a pivotal lock member 80 which is engageable against the latch 70 to lock same in place, as illustrated in FIG. 3. The pivotal position of the lock member 80 is governed by a control rod 82. The position of rod 82 is controlled by a mechanical cable 90 which is received and connects into the bottom portion of the latch assembly. It will be appreciated that preferably there is a latch assembly 60 with an associated cable 90, 91, 92 or 93 for each securement module 30.

A box-like release module 100 is preferably mounted at one side location of the platform. In one form, the release module is bolted to one of the anchoring brackets or positioned adjacent one of the anchoring brackets 50. Each of the mechanical cables 90-93 is connected for actuation with the release module 100. The release module preferably includes a trigger or a lever 110 which magnifies the applied release force. In one position, the lever or trigger is positioned to interact with the mechanical cables 90-93 so that each of the lock mechanisms 80 is placed in a locked position engaging a latch 70. When the lever 110 is pivoted or the trigger pulled to a second position, the lock member 80 of each of the latch assemblies 60 is released. The latches 70 are accordingly released concurrently whereby a single release point actuation releases all of the securement modules 30.

Figure 6:
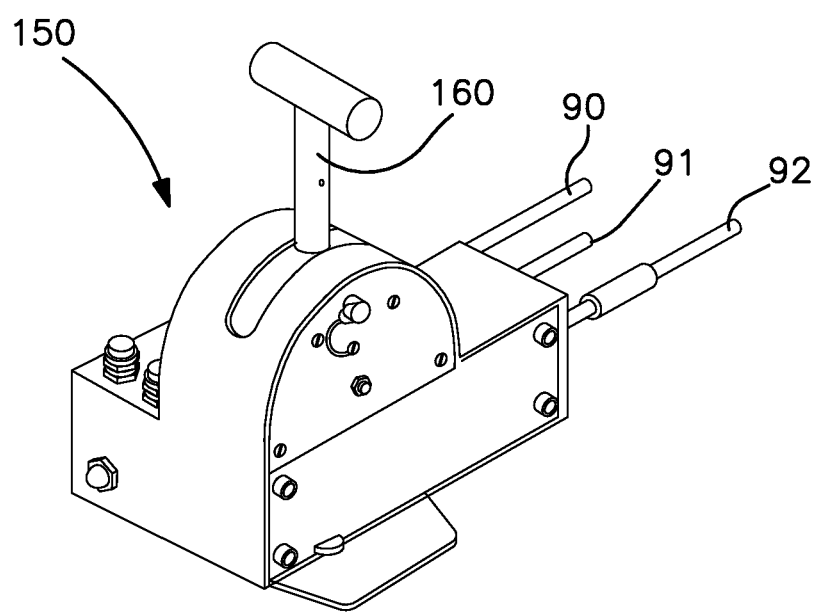
FIG. 6 is an enlarged perspective view of another embodiment of a release module which may be employed for the single point release system.

An alternative embodiment of a release module 150 for a single point release by means of a shiftable lever 160 is illustrated in FIG. 6.

Figure 7:
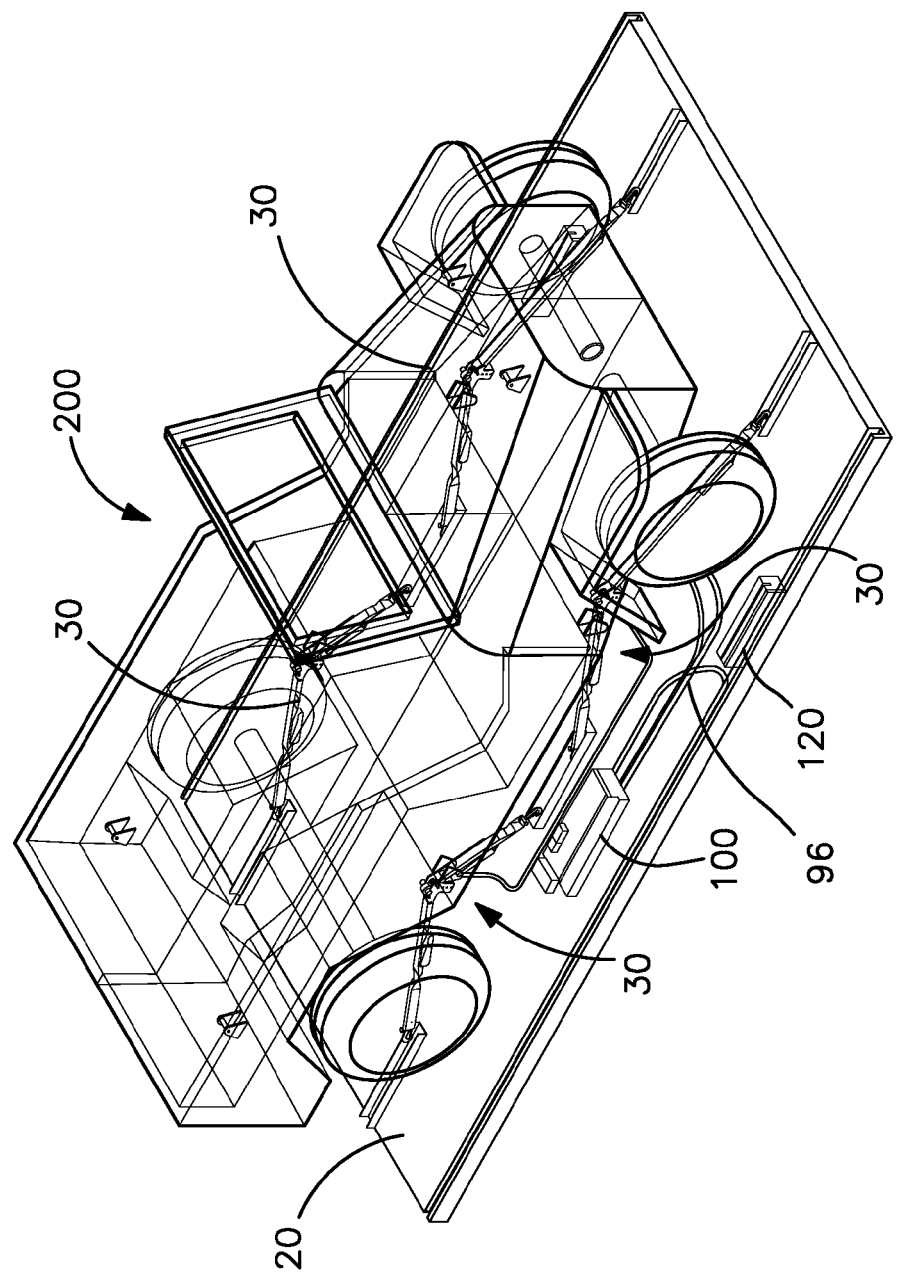
FIG. 7 is a perspective view, partly in schematic and partly in phantom, illustrating an aerial delivery platform incorporating a single point release system employed for aerial delivery of a four-wheeled vehicle.

With reference to FIG. 7, a vehicle 200 is secured by each of the four securement modules 30 to the platform 20. Typically, the straps wrap around the axles or other securement points of the vehicle and are secured under tension by the latch assembly 60. When the aerial platform is landed, the vehicle may be rapidly released by manually shifting the control lever 110 or actuating a trigger at the release module 100 so that the retaining straps essentially release and the vehicle 200 is free to rapidly drive off the cargo platform 20.

For applications which require a mid-air release such as, for example, for a rigid hull inflatable boat, an extraction force transfer coupling ("EFTC") device 120 is also mounted onto the edge of the platform. The EFTC device 120 includes an actuator arm 130 which drops upon release of the platform from the aircraft. The EFTC device includes a cable 96 which is connected to the release module trigger and concurrently actuates each of cables 90-93 to release each lock member 80. Consequently, each of the latch mechanisms of the securement modules will be concurrently released to allow mid-air release of the inflatable boat (not illustrated) from the aerial platform. Alternatively, for land based applications, the EFTC device 120 could be actuated by manual movement of the actuator arm 130 so that the release force is transferred over cable 96 to the release module 100.

The invention claimed is:

1. A single point release system comprising:
a platform;
a plurality of securement modules mounted to said platform, each said module comprising:
a first adjustable strap anchored to said platform and having a first latching end;
a second adjustable strap anchored to said platform and having a second latching end;
a latch mechanism comprising a releasable latch which selectively latches said first and second latching ends and comprising a lock member actuatable by a mechanical cable which engages said latch to lock said latch and to release said latch; and
a release module mounted to the platform and connecting each said cable and configurable in a lock mode wherein each said latch is locked and actuatable in a release mode to concurrently release each said latch.

2. The single point release system of claim 1 and further comprising an extraction force transfer coupling device mounted to said platform and having a cable connecting said release module wherein an extraction force is transferred to actuate said release module.

3. The single point release system of claim 1 wherein said release module is actuated by means of a lever.

4. The single point release system of claim 1 wherein there are four securement modules.

5. The single point release system of claim 1 wherein the latch mechanism comprises an over-center generally C-shaped latch which catches over a latch bar.

* * * * *